United States Patent
Wang et al.

(10) Patent No.: US 7,479,011 B2
(45) Date of Patent: Jan. 20, 2009

(54) LITERACY AND LANGUAGE ASSESSMENT AND ASSOCIATED METHODS

(76) Inventors: Chien Ju Wang, 1026 River Glen West., San Antonio, TX (US) 78216; Linda Jean Lombardino, 560 NE. 7th Ave., Gainesville, FL (US) 32601; Rita Jane Lieberman, 1680 Anna Catherine Dr., Orlando, FL (US) 32828; Jaumeiko Jhaunette Coleman Brown, 1 Scott Cir. NW., Washington, DC (US) 20036-2214; Lois J. Ciolli, 12035 Parrigin Rd., Helotes, TX (US) 78023

( * ) Notice: Subject to any disclaimer, the term of this patent is extended or adjusted under 35 U.S.C. 154(b) by 44 days.

(21) Appl. No.: 11/468,081

(22) Filed: Aug. 29, 2006

(65) Prior Publication Data

US 2007/0048698 A1    Mar. 1, 2007

Related U.S. Application Data

(60) Provisional application No. 60/712,517, filed on Aug. 30, 2005.

(51) Int. Cl.
    *G09B 1/00* (2006.01)
(52) U.S. Cl. .................................................. 434/167
(58) Field of Classification Search ............... 434/156, 434/157, 159, 167, 169, 176, 177, 178, 185, 434/322, 323, 327, 353, 354
    See application file for complete search history.

(56) References Cited

U.S. PATENT DOCUMENTS

| | | | |
|---|---|---|---|
| 4,044,380 A | * | 8/1977 | Justice et al. ............... 348/460 |
| 4,519,606 A | | 5/1985 | Lussiez |
| 4,557,694 A | * | 12/1985 | Nelson ....................... 434/339 |
| 4,586,905 A | * | 5/1986 | Groff ....................... 434/307 R |
| 4,749,353 A | * | 6/1988 | Breedlove ................... 434/169 |
| 4,768,959 A | | 9/1988 | Sprague et al. |
| 5,219,291 A | * | 6/1993 | Fong et al. .................. 434/323 |
| 5,478,240 A | * | 12/1995 | Cogliano .................... 434/327 |
| 6,322,074 B1 | * | 11/2001 | Forrest et al. ............... 273/272 |

(Continued)

OTHER PUBLICATIONS

Types of Educational Tests, test information, [online], [retrieved on May 18, 2006], Retrieved from the Concord SPED PAC website using Internet <URL:http://www.concordspedpac.org/TypesTests.html>.

*Primary Examiner*—Kurt Fernstrom
(74) *Attorney, Agent, or Firm*—Allen Dyer Doppelt Milbrath & Gilchrist

(57) ABSTRACT

An assessment of literacy and linguistic abilities targets a combination of these abilities by asking the subject to spell projected words. The invention achieves a standardized method of scoring developmental responses and achieves facilitated replication that is applicable to any child's responses. The quantitative scoring system and method have proven to be reliable and replicable. The method includes audibly projecting a word to a student. The word consists os a plurality of phonemes, each phoneme corresponding to a sound and to at least one letter. The student is asked to provide an attempt to spell the word based upon the sounds in the word, the attempt comprising at least one letter. The student attempt is scored, and at least partial credit is given for a student attempt that is incorrect but that includes at least one acceptable letter-phoneme correspondence.

10 Claims, 11 Drawing Sheets

U.S. PATENT DOCUMENTS

| | | |
|---|---|---|
| 6,517,351 B2 * | 2/2003 | Spector .................. 434/169 |
| 6,676,412 B1 | 1/2004 | Masterson et al. |
| 6,954,199 B2 * | 10/2005 | Soto et al. ................ 345/173 |
| 6,970,677 B2 | 11/2005 | Jongsma et al. |
| 7,029,283 B2 * | 4/2006 | Marcus et al. ............. 434/323 |
| 7,139,523 B1 * | 11/2006 | Lynch et al. ............... 434/317 |
| 2002/0119429 A1 | 8/2002 | Barton |
| 2003/0039948 A1 | 2/2003 | Donahue |
| 2004/0023191 A1 | 2/2004 | Brown et al. |
| 2004/0113365 A1 | 6/2004 | Martin |
| 2004/0175687 A1 | 9/2004 | Burstein et al. |
| 2004/0185424 A1 | 9/2004 | Kucinski et al. |

* cited by examiner

Invented Spelling

| Grades Administered | Additional Materials | Repetitions | Discontinue |
|---|---|---|---|
| Fall 1st<br>Spring 1st | Paper<br>Pencil | 2 | See Administration Note in Stimulus Book |

| Item | Response | Score | | | | | | |
|---|---|---|---|---|---|---|---|---|
| 1. ball | | | | 4 | 3 | 2 | 1 | 0 |
| 2. bug | | | | 4 | 3 | 2 | 1 | 0 |
| 3. feet | | | | 4 | 3 | 2 | 1 | 0 |
| 4. sick | | | | 4 | 3 | 2 | 1 | 0 |
| 5. thin | | | | 4 | 3 | 2 | 1 | 0 |
| 6. spin | | | 5 | 4 | 3 | 2 | 1 | 0 |
| 7. plate | | | 5 | 4 | 3 | 2 | 1 | 0 |
| 8. rattle | | 6 | 5 | 4 | 3 | 2 | 1 | 0 |
| 9. jump | | 6 | 5 | 4 | 3 | 2 | 1 | 0 |
| 10. hopping | | 6 | 5 | 4 | 3 | 2 | 1 | 0 |
| 11. teaches | 7 | | | 4 | 3 | 2 | 1 | 0 |
| 12. present | 8 | | | 4 | 3 | 2 | 1 | 0 |

| Invented Spelling<br>Total Raw Score | |
|---|---|

FIG. 1

| Criterion-Referenced Score Chart |||
|---|---|---|
| Subtest | Raw Score | Criterion |
| Book Handling | | ☐ Meets<br>☐ Does Not Meet |
| Concept or Word | | ☐ Meets<br>☐ Does Not Meet |
| Matching Symbols | | ☐ Meets<br>☐ Does Not Meet |
| Word Retrieval | | ☐ Meets<br>☐ Does Not Meet |
| Rapid Automatic Naming | Time ——— | ☐ Meets<br>☐ Does Not Meet |
| Invented Spelling | <u>13</u> | ☐ Meets<br>☐ Does Not Meet |
| Letter Knowledge (1st Grade) | | ☐ Meets<br>☐ Does Not Meet |

Invented Spelling

The Invented Spelling subtest involves encouraging the child to spell words. The child is given a sheet of writing paper and asked to write the words that you dictate.

Administration Directions

Follow the administration directions included in the Stimulus Book.

Scoring the Items

The Invented Spelling subtest assesses knowledge of sound-letter correspondences by requiring children to represent as many of the sounds in words as they can by spelling them. Therefore, responses are not just credited if they are spelled correctly; they are also credited for correct letter-sound correspondences. You should not attempt to score the items during administration of the subtest. It is recommended that you score the responses after test administration when you can refer to the scoring guidelines in appendix A. Refer to the *Administration Note* in the Stimulus Book for discontinue rule instructions.

Scoring the Subtest

Compute the Total Raw Score by adding the scores of all items. Transfer the Total Raw Score to the Raw Score column of the Criterion-Referenced Score Chart on page 2 of the Record Form.

FIG. 3

Invented Spelling

The following scoring rules and examples were developed based on children's responses during the tryout and standardization of ALL. You will need to reference these procedures as you score responses to the Invented Spelling subtest. It is likely that the children you test will produce novel responses and you will need to compare their responses to the examples provided and to the scoring chart.

For the acceptable vowels and consonants associated with each test item, refer to Table A.1 and Table A.2 in this appendix.

1. One point is assigned for each acceptable letter representing a sound as shown in the scoring chart for each word. This point is given regardless of the position of the acceptable letter in the word.

- Words with letters out of order
     *ball* is spelled *blla* = 3 points
     *plate* is spelled *palte* = 4 points

- Words with letters missing
     *thin* is spelled *thn* = 2 points
     *sick* is spelled *s* = 1 point

- Words with all letters represented but incorrect spelling
     *ball* is spelled *boll* = 3 points
     *feet* is spelled *ved* = 3 points 2. No points are given for letters unless the letters are shown as acceptable in the scoring chart.

- Words with extra letters
     *rattle* is spelled *raitle* = 4 points
     *jump* is spelled *juhmpt* = 4 points
     *ball* is spelled *baoll* = 3 points 3. A response can include extra letters. However, if a word contains three or more unacceptable or extraneous letters (i.e., letters not shown in the word chart), then the word does not receive any credit, meaning a score of zero.

- Words with 3 or more unacceptable letters
     *rattle* is spelled *werlyn* = 0 points
     *jump* is spelled *pzrifti* = 0 points
     *feet* is spelled *fauf* = 0 points

- Words with 3 or more extraneous letters
     *rattle* is spelled *wratttlol* = 0 points
     *jump* is spelled *gdumpppbl* = 0 points
     *feet* is spelled *fieeeed* = 0 points

FIG. 4A

4. Backwards letters are acceptable (e.g., b/d, g/q)

Note. Acceptable backward letters are presented in italics in the Scoring Chart.

- Backward letters

*ball* is spelled *dall* = 3 points
     *bug* is spelled *buq* = 3 points

5. Silent letters at the end of the words (e.g., silent e as in hide and plate) are not assigned a separate point.

- Words with silent letters

*plate* is spelled *plat* = 4 points
     *rattle* is spelled *ratle* = 4 points 6. If the same acceptable letter occurs twice in a word (especially in two syllable words such as teaches and present), points are given for acceptable letter representation for each of the letters.

- Allowing for two representations of the same letter

*present* is spelled *prisit* = 6 points
     Note. the *e* in the first syllable and the *e* in the second syllable can be replaced by *i*, so both instances of the letter *i* are given a point.

*teaches* is spelled *tjkgie* = 4 points
     Note. the *ea* diphthong in the first syllable and the *e* in the second syllable can both be represented with an *i* or an *e*, so both are given a point.

7. For words that contain letter combinations (e.g., ch, ck, te), one point is given for the combined letters if the letters are presented as one sound. However, if the letters are presented separately in the response, it is possible that each letter could receive one point.

- Words with letter combinations

*plate* is spelled *plte* = 3 points (*p* = 1 pt., *l* = 1 pt., *te* = 1 pt.)
     *plate* is spelled *plet* = 4 points because the *e* represents the *a* sound and the *t* represents the *te* combination 8. An extra point is given if the word is spelled correctly (i.e., conventionally)

- Conventionally spelled words

*sick* is spelled *sick* = 4 points
     Note. Three points for acceptable letters and one point for correct spelling All acceptable letter substitutions for all words in this test are shown in the Scoring Chart. Refer to the chart to decide if a letter(s) is an acceptable substitution.

FIG. 4B

Scoring Chart
*Acceptable backward letters are presented in italics.*

1. ball
| | | | |
|---|---|---|---|
| Conventional letters | b | a | ll |
| Acceptable letters | b,p,*d* | a,o | l,ll |
| Points per letter | 1 | 1 | 1 |
| Total possible points | 3 = acceptable letters; 1 = correct spelling | | |

2. bug
| | | | |
|---|---|---|---|
| Conventional letters | b | u | g |
| Acceptable letters | b,p,*d* | u,o | g,k,c, ck,*q* |
| Points per letter | 1 | 1 | 1 |
| Total possible points | 3 = acceptable letters; 1 = correct spelling | | |

3. feet
| | | | |
|---|---|---|---|
| Conventional letters | f | ee | t |
| Acceptable letters | f,v | i,e,ee, ea,a | t,d |
| Points per letter | 1 | 1 | 1 |
| Total possible points | 3 = acceptable letters; 1 = correct spelling | | |

4. sick
| | | | |
|---|---|---|---|
| Conventional letters | s | i | ck |
| Acceptable letters | s,z,c | i,e | ck,c,k,g |
| Points per letter | 1 | 1 | 1 |
| Total possible points | 3 = acceptable letters; 1 = correct spelling | | |

5. thin
| | | | |
|---|---|---|---|
| Conventional letters | th | i | n |
| Acceptable letters | th,f,t,h | i,e | n |
| Points per letter | 1 | 1 | 1 |
| Total possible points | 3 = acceptable letters; 1 = correct spelling | | |

6. spin
| | | | | |
|---|---|---|---|---|
| Conventional letters | s | p | i | n |
| Acceptable letters | s,z,c | p,b | i,e | n |
| Points per letter | 1 | 1 | 1 | 1 |
| Total possible points | 4 = acceptable letters; 1 = correct spelling | | | |

7. plate
| | | | | |
|---|---|---|---|---|
| Conventional letters | p | l | a | te |
| Acceptable letters | p,b | l | ai,i,ay, ei,e,a | t,d,te,de |
| Points per letter | 1 | 1 | 1 | 1 |
| Total possible points | 4 = acceptable letters; 1 = correct spelling | | | |

FIG. 5A

| 8. rattle | | | | |
|---|---|---|---|---|
| Conventional letters | r | a | tt | le |
| Acceptable letters | r | a,e | tt,dd,t,d | le,l,el,ul,al,ol,il,ll |
| Points per letter | 1 | 1 | 1 | 1 |
| Total possible points | 4 = acceptable letters; 1 = correct spelling | | | |

| 9. jump | | | | |
|---|---|---|---|---|
| Conventional letters | j | u | m | p |
| Acceptable letters | j,g,ch,d | u,o | m | p,b |
| Points per letter | 1 | 1 | 1 | 1 |
| Total possible points | 4 = acceptable letters; 1 = correct spelling | | | |

| 10. hopping | | | | | |
|---|---|---|---|---|---|
| Conventional letters | h | o | pp | i | ng |
| Acceptable letters | h | o,a,u | pp,p,bb,b | i,e | ng,n,g,q,nq |
| Points per letter | 1 | 1 | 1 | 1 | 1 |
| Total possible points | 5 = acceptable letters; 1 = correct spelling | | | | |

| 11. teaches | | | | | |
|---|---|---|---|---|---|
| Conventional letters | t | ea | ch | e | s |
| Acceptable letters | t,d | i,e,ee,ea,a | ch,j,g,t,c,h,sh | e,i,o,u,a | s,z,c |
| Points per letter | 1 | 1 | 1 | 1 | 1 |
| Total possible points | 5 = acceptable letters; 1 = correct spelling | | | | |

| 12. present | | | | | | | |
|---|---|---|---|---|---|---|---|
| Conventional letters | p | r | e | s | e | n | t |
| Acceptable letters | p,b | r | e,i,a | s,z,c | e,i,o,u,a | n | t,d |
| Points per letter | 1 | 1 | 1 | 1 | 1 | 1 | 1 |
| Total possible points | 7 = acceptable letters; 1 = correct spelling | | | | | | |

FIG. 5B

Table A.1 Acceptable Responses for Vowels

| | ɔ | ʌ | ɛ | i | I | e | ɑ | æ | ə |
|---|---|---|---|---|---|---|---|---|---|
| ball | a,o | | | | | | | | |
| bug | | u,o | | | | | | | |
| feet | | | | i,e,ee, ea,a | | | | | |
| sick | | | | | i,e | | | | |
| thin | | | | | i,e | | | | |
| spin | | | | | i,e | | | | |
| plate | | | | | | ai,i,ay,ei, e,a | | | |
| rattle | | | | | | | | a,e | |
| jump | | u,o | | | | | | | |
| hopping | | | | | i,e | | o,a,u | | |
| teaches | | | | i,e,ee, ea,a | | | | | e,i,o, u,a |
| present | | | e,i,a | | | | | | e,i,o, u,a |

FIG. 6

Table A.1 Acceptable Responses for Vowels

| | b | f | g | h | j | k | i | m | n | ng | p | r | s | t | z | ch | th |
|---|---|---|---|---|---|---|---|---|---|---|---|---|---|---|---|---|---|
| ball | b,p,d | | | | | | l,ll | | | | | | | | | | |
| bug | b,p,d | | g,k,c, ck,q | | | | | | | | | | | | | | |
| feet | | f,v | | | | | | | | | | | | t,d | | | |
| sick | | | | | | c,k, ck,g | | | | | | | c,s,z | | | | |
| thin | | | | | | | | | n | | | | | | | | th,f,t,h |
| spin | | | | | | | | | n | | p,b | | c,s,z | | | | |
| plate | | | | | | | l | | | | p,b | | | t,d, te,de | | | |
| rattle | | | | | | | le,l,el,ui al,oi,l,ill | | | | | r | | t,dd, t,d | | | |
| jump | | | | | j,g, ch,d | | | m | | | p,b | | | | | | |
| hopping | | | | h | | | | | | ng,n, g,nq, q | p,b, pp,bb | | | | | | |
| teaches | | | | | | | | | | | | | | t,d | c,s,z | ch,j,g,c, h,sh,t | |
| present | | | | | | | | | n | | p,b | r | | t,d | c,s,z | | |

*Note.* Acceptable backward letters are presented in italics.

LITERACY AND LANGUAGE ASSESSMENT AND ASSOCIATED METHODS

CROSS-REFERENCE TO RELATED APPLICATION

This application claims priority to provisional application Ser. No. 60/712,517, filed Aug. 30, 2005, entitled "Literacy and Language Assessment and Associated Methods."

BACKGROUND OF THE INVENTION

1. Field of the Invention

The present invention relates to assessments and methods for testing literacy and language skills.

2. Related Art

The quantification of children's developmental spelling patterns has not been achieved; therefore, there has been no way to objectively measure a child's performance.

Therefore, it would be advantageous to provide an assessment and method for providing a standardized method of scoring developmental responses to spelling tasks.

SUMMARY OF THE INVENTION

The present invention is directed to an assessment of literacy and linguistic abilities. The assessment targets a combination of these abilities by asking the subject to spell words that are spoken by the administrator. The invention achieves a standardized method of scoring developmental responses in, for example, children, to spelling tasks. Thus the invention achieves facilitated replication by researchers and clinicians, and is applicable to any child's responses. The quantitative scoring system and method that are provided have proven to be reliable and replicable.

In one aspect a method is provided for assessing literacy and linguistic abilities in a student. The method can comprise the step of audibly projecting a word to a student. The word comprises a plurality of phonemes, each phoneme corresponding to a sound and to at least one letter. The student is asked to provide an attempt to spell the word based upon the sounds in the word, the attempt comprising at least one letter. The student attempt is scored, and at least partial credit is given for a student attempt that is incorrect but that includes at least one acceptable letter-phoneme correspondence.

BRIEF DESCRIPTION OF THE DRAWINGS

FIG. 1 is a reproduction of an exemplary record form for the assessment of the present invention.

FIG. 2 is a reproduction of an exemplary score chart.

FIG. 3 is a reproduction of an exemplary set of administration directions.

FIGS. 4A, 4B is a reproduction of an exemplary set of scoring rules.

FIGS. 5A, 5B is a reproduction of an exemplary scoring chart.

FIG. 6 is a representation of an exemplary set of acceptable responses for vowels.

FIG. 7 is a representation of an exemplary set of acceptable responses for consonants.

DETAILED DESCRIPTION OF THE PREFERRED EMBODIMENTS

Figure 8:
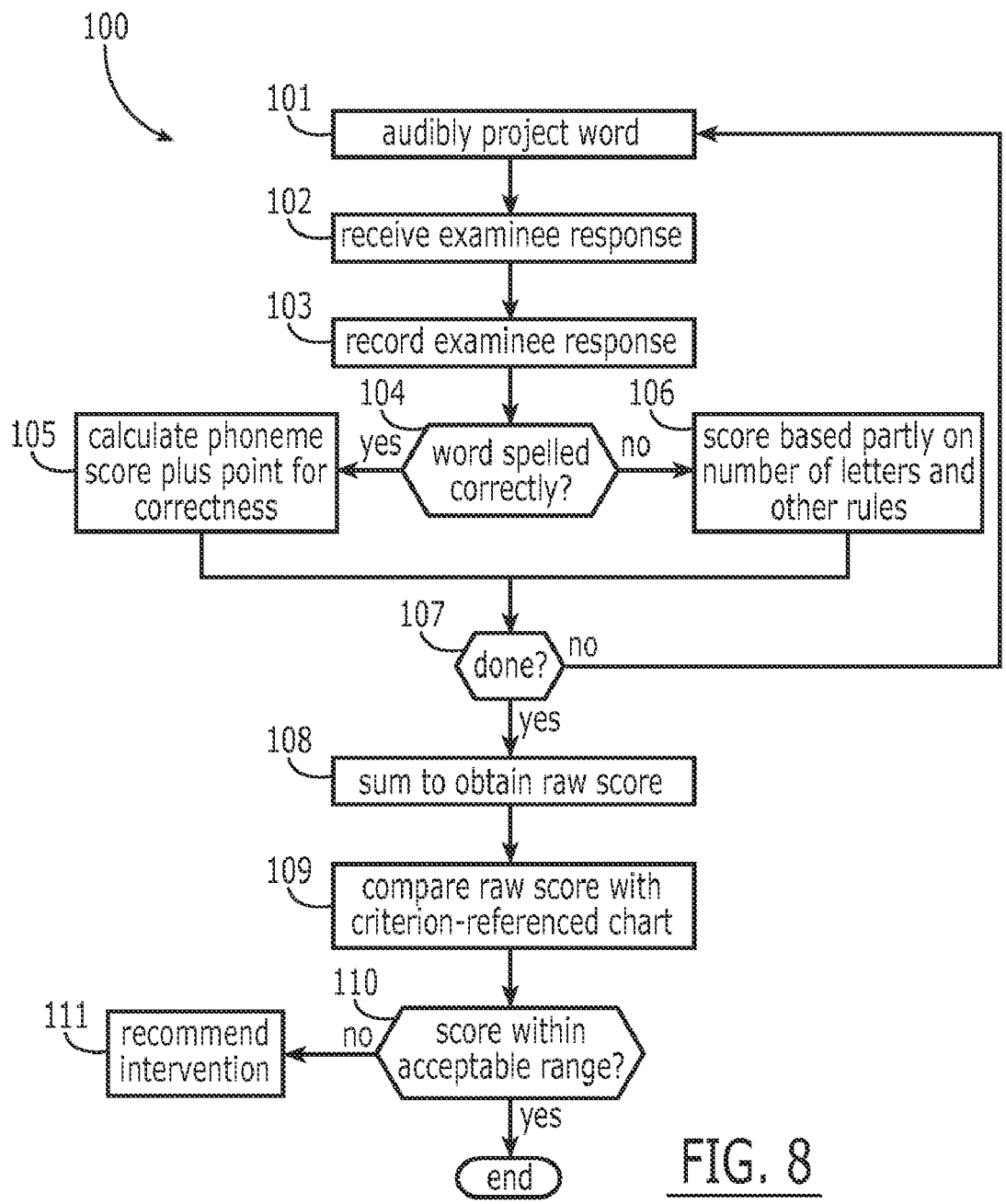
FIG. 8 is a flowchart of an exemplary method of the present invention.
Figure 9:
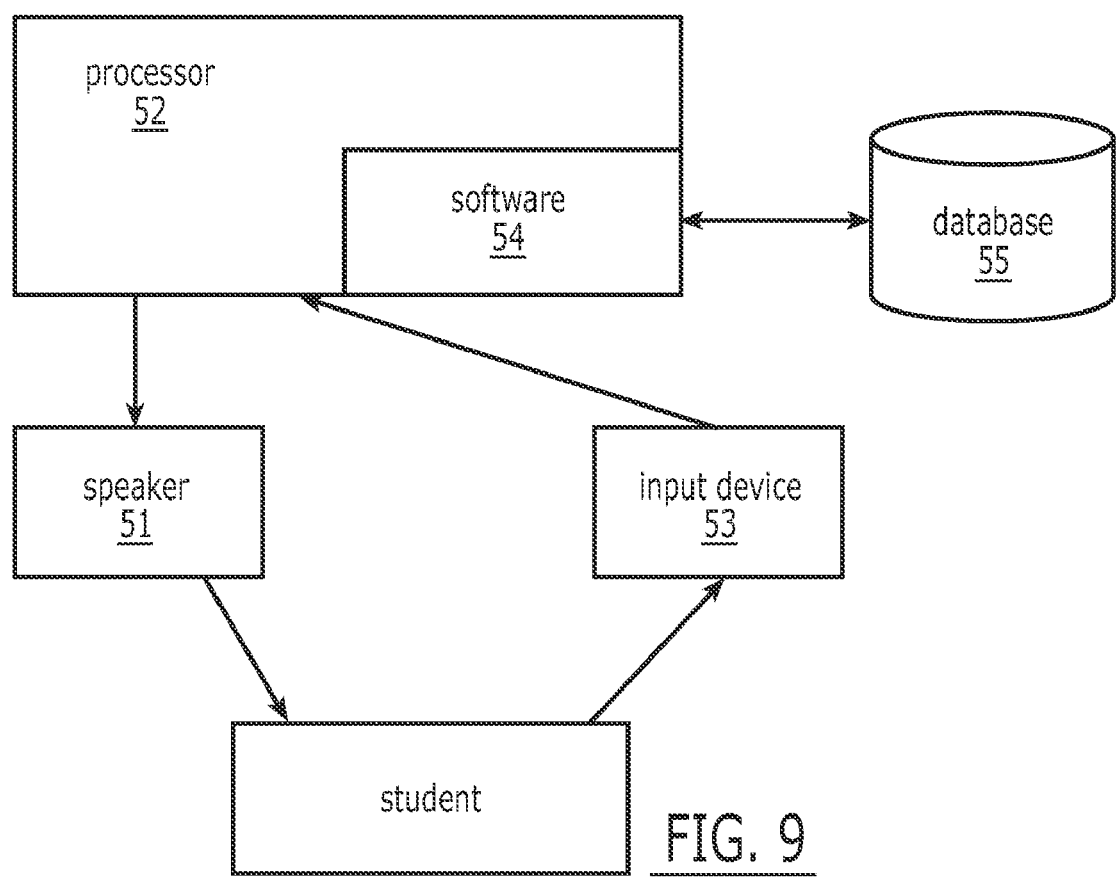
FIG. 9 is an exemplary schematic diagram for a computerized version of the assessment.

A description of the preferred embodiments of the present invention will now be presented with reference to FIGS. 1-9.

The assessment and method 100 (FIG. 8) of the present invention comprise encouraging the subject, typically a child, to spell words, in a form called "invented spelling." The child is given a piece of paper and asked to record words that are dictated or audibly projected (block 101) in any other method or system 50 (FIG. 9) contemplated in the art, for example, via a speaker 51 under processor 52 control. An exemplary list 10 of such words, each of which comprises a plurality of phonemes, is given in FIG. 1. The examinee's response (block 102) is recorded (block 103) on the form in a response sector 11, and the scoring method using the score sector 12 is to the right of the response sector 11. The raw score 13 is recorded at the bottom of the form and is, after administration, recorded on a record form 14 such as reproduced in FIG. 2.

In FIG. 3 is reproduced an exemplary set of administration directions 15 for the test administrator to follow, in which the examinee is asked to spell the words such as listed in FIG. 1 based upon their sounds. The examinee is given paper and pencil, or other means for recording an answer, such as a computer input device 53 in communication with the processor 52, for example, and is asked to write/record the words as they are dictated.

The assessment tests the examinee's knowledge of sound/phoneme-letter correspondences by requiring him/her to represent as many of the sounds in words as he/she can by spelling them. In this system and method, responses are not just credited if they are spelled correctly; they are also credited for correct letter-sound correspondences.

It is preferred that the administrator not attempt to score the items during administration of the test, but rather after completion of the assessment, with reference to scoring guidelines such as those reproduced in FIGS. 4A-7. As seen in FIGS. 4A, 4B, some points can be awarded even if the word is not spelled correctly, for example, if the letters are out of order, or a letter is missing.

The exemplary scoring chart of FIGS. 5A, 5B illustrates for each word in the list of FIG. 1 the conventional letters, acceptable letters, points per letter, and the total possible point value of the word, which corresponds to the scoring sector 12 of FIG. 1.

In addition to the chart of FIGS. 5A, 5B, acceptable responses for vowels and consonants are given in FIGS. 6 and 7.

In a particular embodiment, a maximum score allottable for a correctly spelled word is related to a number of phonemes in the word. For example, the maximum score allottable for a correctly spelled word (block 104) is further augmented for being correct, e.g., by adding a point to the score, which, for a correctly spelled word, can comprise one point for each phoneme and one point for correctness (block 105).

The score for an incorrectly spelled word (block 104) is at least partially based upon the attempt containing a correct number of letters (block 106). The partial credit can be disallowed, however, if the attempt further includes a predetermined error. The predetermined error can comprise, for example, the attempt containing more than a predetermined number of extraneous letters, or more than a predetermined number of unacceptable letters.

The letter in the acceptable letter-phoneme correspondence can comprise one of a plurality of letters substitutable for each other. Such substitutable letters can comprise backwards letters, silent letters at an end of the word, a single representation of a double letter, or a consonant in a common voiced/voiceless pair. The letter in the acceptable letter-phoneme correspondence can also comprise one of a predetermined set of letters having a common characteristic, as giving in FIGS. 6 and 7.

Typically these steps will be repeated a plurality of times (block 107) for a plurality of different words, the sum comprising a raw score (block 108). Preferably this raw score is then compared with a criterion-referenced chart (block 109) to determine whether the child is within an acceptable range (block 110) or may need intervention (block 111).

In the computerized system 10 embodiment (FIG. 9), the scoring can be performed by software 54 that can access tables in a database 55 such as those represented in FIGS. 5A and 5B to calculate a raw score, and can access a criterion-referenced chart also resident in the database 55 to determine whether intervention should be recommended.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A system for administering an assessment of literacy and linguistic abilities in a student comprising:
   means for audibly projecting a word to a student, the word comprising a plurality of phonemes, each phoneme corresponding to a sound and to at least one letter;
   means for asking the student to provide an attempt to spell the word based upon the sounds in the word, the attempt comprising at least one letter;
   means for receiving the student attempt; and
   means for scoring the student attempt, wherein at least partial credit is given for a student attempt that is incorrect but that includes at least one acceptable letter-phoneme correspondence.

2. The system recited in claim 1, further comprising a processor and software resident thereon for administering and scoring the assessment, and wherein the projecting means and the asking means comprise a speaker under control of the processor, and the receiving means comprises an input device in signal communication with the processor.

3. The system recited in claim 2, wherein the scoring means comprises a code segment in the software comprising a set of rules for calculating a score for each attempt.

4. The system recited in claim 3, wherein the rule set comprises a rule that a maximum score allottable for a correctly spelled word is related to a number of phonemes in the word.

5. The system recited in claim 4, wherein the rule set comprises a rule that the maximum score allottable for a correctly spelled word is further augmented for being correct.

6. The system recited in claim 5, wherein the rule set comprises a rule that the maximum score allottable for a correctly spelled word comprises one point for each phoneme and one point for correctness.

7. The system recited in claim 3, wherein the rule set comprises a rule wherein the score for an incorrectly spelled word is at least partially based upon the attempt containing a correct number of letters.

8. The system recited in claim 3, wherein the rule set comprises a rule wherein the at least partial credit is disallowed if the attempt further includes a predetermined error.

9. The system recited in claim 8, wherein the predetermined error comprises the attempt containing at least one of more than a predetermined number of extraneous letters and more than a predetermined number of unacceptable letters.

10. The system recited in claim 3, wherein the letter in the acceptable letter-phoneme correspondence comprises one of a plurality of letters substitutable for each other, and wherein the substitutable letters comprise backwards letters, silent letters at an end of the word, a single representation of a double letter, a consonant in a common voiced/voiceless pair, and one of a predetermined set of letters having a common characteristic.

* * * * *